Sept. 27, 1960    R. C. KOHRN ET AL    2,953,839
ELASTOMERIC THREAD
Filed Aug. 21, 1958
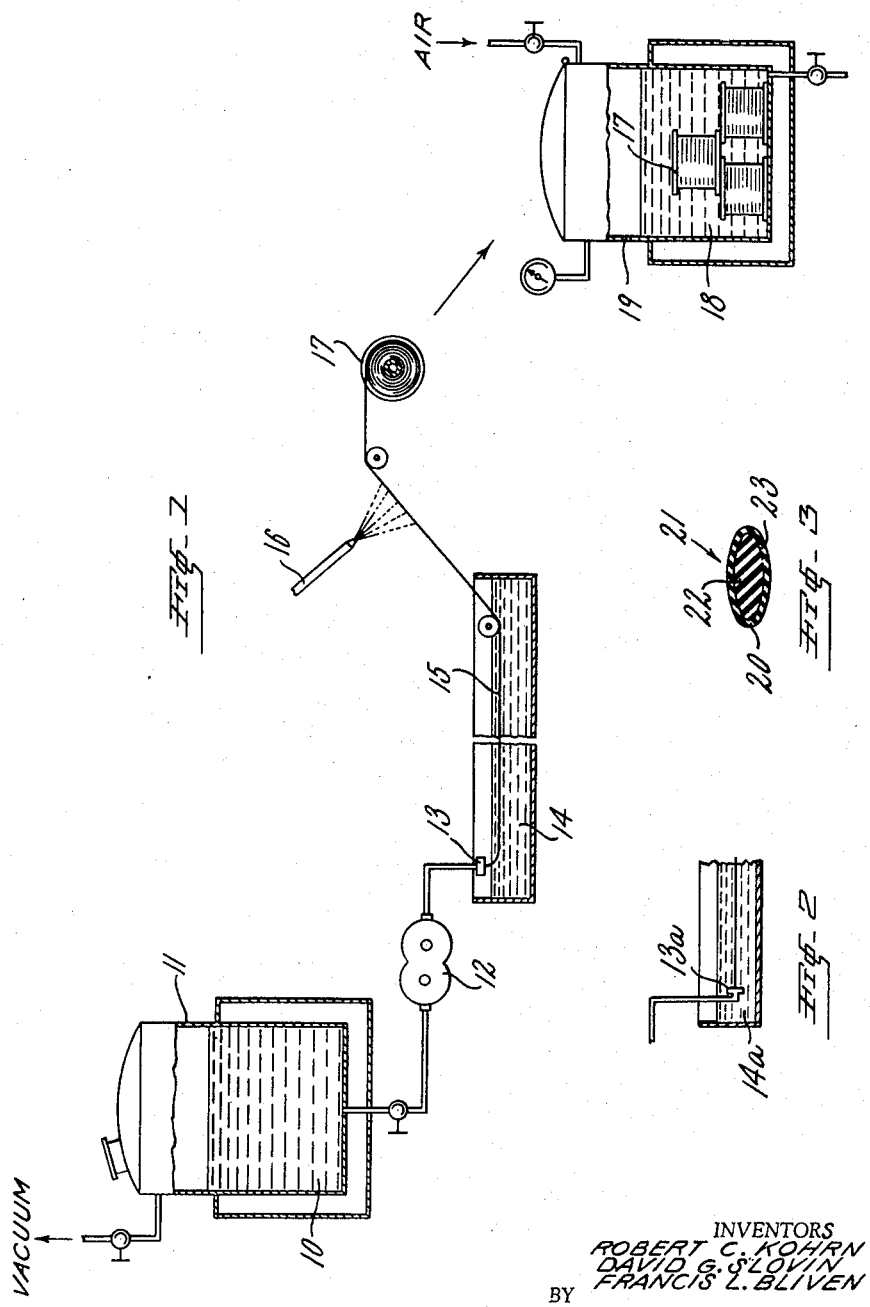
INVENTORS
ROBERT C. KOHRN
DAVID G. SLOVIN
FRANCIS L. BLIVEN
BY
James J. Long
AGENT

United States Patent Office 2,953,839
Patented Sept. 27, 1960

2,953,839

ELASTOMERIC THREAD

Robert C. Kohrn and David G. Slovin, Cranston, R.I., and Francis L. Bliven, South Attleboro, Mass., assignors to United States Rubber Company, New York, N.Y., a corporation of New Jersey Filed Aug. 21, 1958, Ser. No. 756,420

Claims priority, application Great Britain Sept. 27, 1957

6 Claims. (Cl. 28—82)

This invention relates to filamentary material, and more particularly it relates to the production of a polyurethane thread or filament having improved properties.

This application is a continuation-in-part of our application Serial No. 622,370, filed November 15, 1956, and now abandoned.

We are aware that it has heretofore been proposed to make elastomeric threads from polyurethanes. Thus, U.S. Patent 2,650,212, Windemuth, August 25, 1953, shows such a thread in Example I. However, it has been desired to produce a thread of superior properties, by a more feasible method. Similarly, it has been desired to improve upon the process and product of U.S. Patent 2,755,266, Brenschede, July 17, 1956.

One object of the invention is to provide an elastic polyurethane thread that is capable of undergoing a relatively high elongation without breaking.

Another object of the invention is to provide a method of making polyurethane thread from a liquid prepolymer which is comparatively stable and has a reasonably long "pot life" so that it can be prepared and processed efficiently.

Still another object of the invention is to provide a method of "setting" or hardening rapidly a fine stream of liquid prepolymer in the form of a thread of filament.

It is yet another object of the invention to provide a method of forming and curing a polyurethane elastomer in the form of a thread without encountering blowing of the thread or formation of similar discontinuities or defects.

The manner in which the invention accomplishes the foregoing objects, as well as additional objects and advantages, will be made manifest in the following detailed description, which is intended to be read in conjunction with the accompanying drawing, wherein:

Fig. 1 illustrates, in purely diagrammatic fashion, one method of carrying out the invention;

Fig. 2 is a fragmentary view of a modified arrangement of a nozzle in a setting bath; and Fig. 3 is a cross-sectional view of a thread made in accordance with the invention.

The invention is based on the unexpected discovery that thread or filament of good quality is obtained by forcing a liquid prepolymer, which is a reaction product of a polymer having terminal alcoholic hydroxyl groups with an aromatic diisocyanate, through a fine nozzle, or spinnerette, into a solution comprising a diprimary diamine, which effects a rapid setting of the surface of the liquid prepolymer, so that it may be handled as a thread. This thread, which is actually a fluid core surrounded by a solid skin, is subsequently cured with water in a manner to be described in detail below, to obtain a completely solid, strong, elastic thread having an unusual combination of desirable physical and chemical properties.

The liquid polyurethane prepolymer employed in the invention is typically derived from a polymer of molecular weight from 300 to 5000 having terminal hydroxyl groups. Such polymer may be a chain extended polyester made from a glycol, preferably a mixture of ethylene and propylene glycols, and a saturated organic dicarboxylic acid, preferably adipic acid. Usually the glycol contains from 4 to 20 carbon atoms, and the acid contains from 4 to 20 carbon atoms. An excess of the glycol over the acid is used in preparing the polyester, so that the resulting polyester contains terminal hydroxyl groups. Usually such an amount of glycol is used as to give a polyester having a hydroxyl number of 20 to 225, and preferably 36 to 75, and a low acid value less than 6 and preferably less than 1. The molecular weight of the polyester usually ranges from 500 to 5,000 and preferably from 1500 to 3000. In general the most suitable polyesters are chiefly linear in type with melting point levels of 90° C. or lower.

Other examples of suitable polyesters for use in preparing the prepolymer are polyethylene adipate, polyethylene adipate-phthalate, polyneopentyl sebacate, etc. If desired, small amounts of tri-alcohols such as trimethylolpropane or trimethylolethane may be included in the preparation of the glycol-dicarboxylic acid polyester, and such modified forms of polyester are included within the term polyester as used herein.

As an alternative to the polyesters just described there may be used (for reaction with the polyisocyanate) one or more members of the class of elastomer-yielding polyethers. Such polyethers are typically anhydrous chain-extended polyethers possessing either linkages (—O—) separated by hydrocarbon chains either alkyl or aryl in nature. The ether should also contain terminal groups reactive to isocyanate, such as alcoholic hydroxyl groups. Such polyether may be linear, or it may be branched. Usually the polyethers used are chiefly linear in type with melting point levels of 90° C. or lower. The molecular weight may range from 500 to 5,000 (i.e., hydroxyl number of about 225 to 22), but is preferably within the range of 750 to 3,500 (i.e., hydroxyl number of about 150 to 45). Preferred polyethers may be represented by the formula $H(OR)_nOH$ where R is a lower (2–6 carbon atoms) alkylene group and $n$ is an integer such that the molecular weight falls within the range specified. Examples of polyethers used are polyethylene glycol, polypropylene glycol, polypropylene-ethylene glycol, and polytetramethylene glycol.

Polyethers not only can be used in place of the polyester but can be used in conjunction with the polyester either as an added reagent or as an intimate part of the polyester molecule thus forming a poly-ether-ester. Examples of such poly-ether-esters are poly diethylene glycol adipate and poly triethylene glycol adipate. The expressions "polyester" or "polyether" as used herein therefore include poly-ether-esters (whether the ethers and esters are physically mixed, or chemically combined), as equivalents of the polyesters or polyethers.

Further examples of polyesters or polyethers suitable for forming prepolymers useful in the invention are the polyesters and polyethers mentioned in U.S. Patents 2,606,162, Coffey, August 5, 1952; 2,801,990, Seeger, August 6, 1958; 2,801,648, Anderson, August 6, 1957; and 2,814,606, Stilmar, November 26, 1957. It is desired to emphasize that the invention contemplates the use of any and all such known polyethers or polyesters (including the poly-ether-esters) suitable for reaction with an aromatic diisocyanate to yield a polyurethane prepolymer capable of being cured to an elastomeric state by the action of water.

The polyester or polyether (including poly-ether-ester) is, as indicated, reacted with an aromatic diisocyanate, such as p,p'-diphenylmethane diisocyanate or toluene diisocyanate, using a considerable molar excess, commonly from a 20% to a 250% and preferably from a 50% to a 150% molar excess, of the aromatic diisocyanate over that amount which would be required to react with all of the alcoholic hydroxyl groups furnished by the polyester. The reaction is frequently effected by mixing the polyester and the aromatic diisocyanate under anhydrous conditions either at room temperature, or at a moderately elevated temperature, e.g., 70–150° C., to form a soluble (in methyl ethyl ketone), uncured, liquid prepolymer which is an essentially linear polyurethane having terminal isocyanate groups.

Representative of the aromatic diisocyanates that may be mentioned, by way of non-limiting examples, are such materials as m- and p-phenylene diisocyanate, toluene diisocyanate, p,p'-diphenyl diisocyanate and 1,5-naphthalene diisocyanate, and in this category we include the aromatic-aliphatic diisocyanates such as p,p'-diphenylmethane diisocyanate. Many other aromatic diisocyanates suitable for reaction with polyesters or the like to yield polyurethane prepolymers capable of being cured to the elastomeric state are disclosed in the prior art (such as the patents referred to previously), and it is desired to emphasize that the invention embraces the use of any and all such aromatic diisocyanates.

The invention contemplates the conversion of the liquid polyurethane prepolymer into a solid thread by first extruding the liquid in a fine stream, and thereafter converting such liquid stream into a solid thread by a two-stage curing process. In accordance with the invention, it has been found that thread having vastly superior physical properties is produced by first setting or curing the outside surface only of the extruded stream of liquid prepolymer, by the action of a diprimary diamine on such liquid stream. There is thus produced initially a composite thread-like body having a fluid core of uncured prepolymer, and an outer skin or encasing shell of prepolymer that has been set or cured to a solid state by the action of the diprimary diamine. Subsequently, the thread is subjected to the action of water, preferably under pressure, which causes the liquid core or central portion of the thread to be cured to a solid state also. The cured thread of the invention is therefore characterized by the fact that the bulk of the thread is cured by water, and the thread has two distinct areas in cross-section, the outer portion being essentially a diprimary diamine cured surface, and the interior of the thread being a water cured material.

The setting bath comprises an aqueous solution of an aliphatic diamine, such as ethylene diamine or hexamethylene diamine. The aqueous diamine solution used as the setting bath may contain, for example, from 0.5% to 20% of the diamine, and it may be employed at ordinary ambient temperatures, or heated to an elevated temperature (e.g., 100° F., up to, for example, 200° F.). Preferably the setting bath is operated at a temperature of from 110° to 160° F., depending on the thickness of the extruded filament. With small filaments of about 150 size (i.e., 150 to the inch), setting bath temperatures of about 110°–120° F. are most suitable. For larger filaments of about 75 size, temperatures of about 140°–160° F. are most suitable. The surface of the liquid prepolymer stream, as it emerges from the extruding nozzle and passes into the bath, is quickly converted into a solid condition, thus forming an encasement or skin for the central fluid portion of the stream.

The amines most suitable for this purpose are diprimary diamines that may be represented by the general formula $NH_2$—A—$NH_2$, where A is a divalent organic radical in which the terminal atoms are carbon, and which is preferably devoid of groups reactive with isocyanate, that is, the two primary amino groups are preferably the sole groups in the molecule that will react with the isocyanate groups of the polyesterdiisocyanate, to provide the desired curing action. In the preferred diprimary diamines employed in the invention the two primary amino groups are linked by a divalent aliphatic hydrocarbon radical, as in ethylene diamine, hexamethylenediamine, 1,4-diaminocyclohexane, etc. However, the connecting radical between the two essential primary amino groups need not be purely a hydrocarbon, but may contain other atoms in addition to carbon and hydrogen, as in 3,3'-diaminodipropyl ether, and diamino-dibutyl sulfide. The amine should be at least slightly soluble in water.

In accordance with a preferred practice of the invention, there is included in the setting bath a small amount (typically about ½%, although the amount is not critical) of a wetting agent. This is frequently found to be useful in insuring complete and uniform setting of the entire surface of the extruded filament. In general, any known wetting agents of the non-ionic or anionic type are suitable for this purpose (such as those disclosed, for example, in Sisley and Wood "Encyclopedia of Surface Active Agents"), and among the more effective wetting agents there may be mentioned the sodium salts of products obtained by sulfation of higher fatty alcohols (e.g., sodium oleyl sulfonate). The anionic wetting agents are preferred.

The filament thus formed, having a solid skin and a fluid core, is passed through the setting bath for a short distance and is then ready for curing of the core. It has been found in accordance with the invention that the best properties are obtained when the core is cured by submerging the thread in water at controlled temperature and preferably under pressure. The thread is subjected to the action of water at a temperature of 100–160° F., and preferably about 130–145° F., and is typically under a pressure of at least 50–150 pounds per square inch, preferably about 80–100 pounds per square inch. Under these conditions the water diffuses through the solid surface skin into the fluid core, where it reacts chemically with the available isocyanate groups of the prepolymer, thus bringing about a cure of the core. This water cure of the core is believed to be in large measure responsible for the excellent physical properties of the present thread. The rate of cure increases as the temperature increases, and therefore the curing can be accomplished in a short time under the conditions stated (varying, for example, from ¼ hour to 8 hours, preferably ½ hour to 4 hours, depending on the temperature of the water, the thickness of the thread, the size of the spool, the exact composition of the polymer, etc.). Under the conditions stated, the thread is found to be free from bubbles or similar voids or defects, because the applied pressure is sufficient to prevent any blowing action due to the carbon dioxide released as a by-product of the reaction of the water with the available isocyanate groups of the prepolymer.

After the thread is initially "set" or surface-cured in the setting bath, the thread may be treated with a weak aqueous ammonia solution (e.g., 0.1 to 5% ammonia) in water if there is any tendency toward stickiness or tackiness.

The thread is reeled up into packages or spools as it emerges from the setting bath, and these spools constitute an ideal form in which to cure the thread, since a number of the spools can be deposited in a tank or autoclave, containing water in which the spools are submerged, and thus the curing of a large quantity of thread can be effected in a single batch.

Not the least important advantage of the invention lies in the fact that the polyester (or the like)-aromatic diisocyanate prepolymer described is capable of casehardening or surface-curing rapidly and uniformly, when treated as disclosed above, without any necessity for using catalytic or promoting materials in the prepolymer itself. Since the prepolymer is free of curing agents or catalytic or promoting materials, it has a relatively long "shelf life" or "pot life" at ordinary temperatures, that is, it does not have to be all used up within a very short time after it is prepared. The prepolymer is essentially stable, and as long as it is preserved from contact with moisture or from exposure to excessive temperatures, it remains in a usable, free-flowing liquid condition for a relative long period of time. Therefore, there is little danger of the prepolymer composition setting up or hardening in the pumping or injecting system used to extrude the prepolymer into the setting bath, and the nozzles likewise are not subject to undue fouling or clogging, due to premature setting up of the liquid prepolymer.

The following examples will serve to illustrate the practice of the invention in more detail (all parts being expressed by weight):

Example I

A polyester was prepared from the following ingredients:

|  | Moles | Parts |
| --- | --- | --- |
| Ethylene glycol | 0.98 | 0.253 |
| Propylene glycol | 0.42 | 0.132 |
| Adipic acid | 1.00 | 0.615 |

The mixture was heated at 220–230° C., while subjecting to vacuum to remove the water of esterification and a certain amount of the unreacted glycol. The extent of the vacuum stripping determined the molecular weight of the polyester, as calculated from the acid number and the hydroxyl number. The polyester used in this example had a molecular weight of about 1900, a hydroxyl number of about 58 and an acid number of about 1.0.

The foregoing polyester resin was mixed at a temperature of 85° C. for 1 hour with an excess of p,p-diphenylmethane diisocyanate in the proportion of 100 parts by weight of the polyester to 29.7 parts of the diisocyanate. A reaction occurred between the hydroxyl groups of the polyester and the isocyanate groups to form a polyurethane intermediate characterized by the presence of unreacted isocyanate groups. This intermediate was a liquid which was soluble in the common organic solvents such as acetone. Referring to Fig. 1 of the drawing, a quantity of the liquid 10 was placed in a supply tank 11 connected to a pump 12, which in turn led to a nozzle 13 suspended just above the surface of an aqueous solution 14 containing 5% ethylene diamine and 0.5% of a non-ionic wetting agent, sodium lauryl sulfate ("Duponol ME" supplied by Du Pont). (If desired, the nozzle 13a may be immersed below the surface of the setting bath 14a as shown in Fig. 2.) The diameter of the opening in the nozzle was 0.03". The pump delivered 1 cc. of the prepolymer per minute through the nozzle into the setting bath, which was maintained in this case at a temperature of 130° F.

The surface of the extruded liquid set to a solid condition almost immediately in the setting bath, and the resulting thread 15 (which still has a fluid core) was conveyed through the bath for a distance of about 8 feet at a speed of about eighty feet per minute. The thread then passed out of the bath and thereafter it was (optionally) lightly sprayed by means of a nozzle 16 with a solution of 0.5% of ammonia in water to destroy any tackiness. The thread was wound up on a reel 17 at a speed of about 140 feet per minute. The reel was immersed in water 18 in an enclosed tank 19, and air pressure was applied in the upper portion of the tank above the surface of the water, at ninety pounds per square inch. The water was heated to 130° F. for a period of forty-five minutes. The fluid core of the thread thereby became substantially completely cured. The diameter of the thread was 0.0065 inch. Its physical properties were:

| Tensile strength | p.s.i. | 9000 |
| --- | --- | --- |
| Elongation | percent | 700 |
| Set | do | 20 |

The resulting thread is characterized by a unique structure in that the outer skin or layer 20 (Fig. 3) of the finished thread 21 is a polyurethane material that has been cured essentially by chemical reaction with a rapid curing agent, viz., a diprimary diamine, while the central area or core 22 is a polyurethane material that has been cured essentially by chemical reaction with water. Although these two more or less concentric zones of the thread cross-section are shown in Fig. 3 as having a definite line of separation 23, it will be understood that in practice there may be an intermediate zone, located between the outer diprimary diamine cured skin and the inner water cured core, which intermediate zone is cured in part by diamine and in part by water. It will also be understood that the relative thickness of the diprimary diamine cured skin, compared to the total diameter of the thread, may vary somewhat in practice, depending on the exact conditions of treatment of the thread, and the exact composition of the polyurethane. Also, it will be understood that although the outer skin is preferred to be essentially diamine cured, this is not intended to exclude the possibility that there is some residual curing potentiality left in the skin after the diamine treatment, so that a certain amount of water cure would take place in the skin in the subsequent stage of the process. Conversely, the reference to the core as essentially water cured is not intended to exclude the possibility that a small amount of the diprimary diamine might diffuse through the initially formed skin into the interior core, and there produce a limited amount of cure. The essential point is that in the core or main body of the thread the cure is advanced virtually solely with water. Basically, the core or body of the thread is a reaction product of the polyurethane prepolymer with water, while the skin or covering layer is a reaction product of the polyurethane prepolymer with the diprimary diamine curative.

The finished thread 21 is represented in Fig. 2 as having more or less oval shape. In practice the shape of the thread may vary from nearly round, to nearly a flat ribbon, depending on the exact conditions of the setting bath.

Example II

A prepolymer was prepared by reacting, at a temperature of 150° C. for a time of 90 minutes, two moles (500 parts) of diphenylmethane diisocyanate and one mole (1950 parts) of polyethylene/tetramethylene (ratio 60/40) adipate (mol. wt. 950, acid value less than 1, hydroxyl number about 56) to yield a material with a molecular weight of 2450. The prepolymer was extruded into an aqueous bath containing 4% of ethylene diamine and ½% of a wetting agent (such as, for example, "Triton X-100" supplied by Rohm and Haas, being an alkylaryl polyether alcohol, i.e., the condensation product of ethylene oxide with an alkyl phenol, e.g. normal butyl phenol), maintained at a temperature of 140° F., as described in Example I. The resulting thread was taken up on a drum at a speed of 77 feet per minute and cured for 3¼ hours at 105° F. and atmospheric pressure under water. The physical properties of the thread are listed below:

| Size | 100 to the inch. |
| --- | --- |
| Percent set | 50. |
| Tensile strength | 4,200 p.s.i. |
| Elongation | 610%. |
| 300% massaged modulus [1] | 177 p.s.i. |

[1] Stress on return cycle after 8 repeated strains to 600% elongation.

Example III

An ethylene-propylene adipate polyester was prepared as in Example I and 1 mole (1900 parts) of this polyester was reacted (150 minutes at 120° C.) with 1.9 moles (331 parts) of toluene diisocyanate ("Hylene TM" supplied by Du Pont). The resulting prepolymer was extruded into an aqueous bath containing 4% of ethylene diamine and ½% of Triton X–100 according to the procedure described in Example I. The resulting thread was sprayed with ½% ammonia as an anti-tack agent and taken up on a drum at a speed of 77 feet per minute. The physical properties of the thread after curing for 90 minutes at 150° F. and 90 p.s.i. under water were as follows:

| | |
|---|---|
| Size | 66 |
| Percent set | 15 |
| Tensile strength p.s.i. | 7000 |
| Elongation percent | 980 |
| 300% massaged modulus p.s.i. | 158 |

*Example IV*

A prepolymer is prepared essentially as in Example III, using two moles of methylene diisocyanate ("Nacconate 300" supplied by National Aniline) and one mole of diethylene glycol adipate ("Multron R–16" supplied by Mobay Chemical Co., viscosity 600–800 cps. at 163° F., density 1.19 at 77° F., acid number less than 2, hydroxyl number 36–40). The resulting polymer is then extruded into a water solution containing 3% of ethylene diamine and ½% of a wetting agent (e.g. "Duponol D" supplied by Du Pont, sodium salt of lauryl [or similar higher fatty alcohol] sulfate). The resulting thread is cured 2 hours at 140° F. and 90 p.s.i. under water.

*Example V*

Prepolymer is prepared as described in Example I and extruded into various water bath solutions.

The prepolymer is extruded into a bath of water maintained at 140° F. The thread is too weak to pull out of the bath.

The prepolymer is extruded into a bath of water containing ½% of a wetting agent ("Duponol D") maintained at 140° F. The thread is too weak to pull through the bath.

The prepolymer is extruded into an aqueous bath of 10% piperazine maintained at a temperature of 146–160° F. The thread is too weak to pull out of the bath.

The prepolymer is extruded into an aqueous bath of 5% propylene diamine and ½% "Duponol D" maintained at 130° F. The thread is taken up at 66 feet per minute. The thread is cured 2 hours at 140° F. and 70 p.s.i. under water. It has good physical properties.

The prepolymer is similarly extruded into a bath containing 5% of 1,3-diamino-propane and similarly cured at 140° F. with equivalent results. Similarly, a bath of 5% of 1,6-heane-diamine is used with similar results after cure at 190° F.

*Example VI*

One mole of polyether, polytetramethylene glycol (2800 molecular weight, hydroxyl number of 40.2), was reacted with 2.05 moles (513 grams) of p,p'-diisocyanato-diphenylmethane for one hour at 100° C. This prepolymer was extruded into a 5% aqueous ethylene diamine bath at 110° F. and subsequently cured under water at room temperature to give a thread of the following properties: Tensile strength 9–10,000 p.s.i., elongation 600–700%, 300% modulus of 14–1600 p.s.i., 500% modulus of 4500–4800 p.s.i., 300% massaged modulus of 225–375 p.s.i., tensile set of 55% (8 cycles to 500%).

*Example VII*

A polyester was made from adipic acid and a mixture of 7.61 moles of triethylene glycol and 0.5 mole of trimethylolethane. (It will be noted that the glycol-dicarboxylic acid polyester used in this example includes a small amount of a triol, but for purposes of the invention this glycol-dicarboxylic acid polyester may still be regarded as an essentially linear material.) This polyester had a hydroxyl number of 60.7 and an acid number of .43 for an equivalent weight of 917. This polyester (130 grams, .142 equiv.) and tolylene diisocyanate (mixed isomers, 21.65 grams; .249 equiv.) were reacted with stirring at 100° for one hour. This prepolymer was extruded into a 5% aqueous ethylene diamine solution at 107° F. and subsequently cured under water at 70° F. for 48 hours to give a thread having a tensile strength of 5–600 p.s.i. and an elongation of 100–250%.

*Example VIII*

A polyester was prepared from ethylene glycol and a mixture of adipic and phthalic acids (70/30 mole ratio) using conventional methods. The polyester had a molecular weight of 2300 (the hydroxyl number was 48.6 and the acid number was 0.18). Three hundred grams (.13 mole) of this polyester was reacted with 77 grams (.308 mole) p,p'-diisocyanatodiphenylmethane at 100° C. for one hour. This prepolymer was extruded into a 3% aqueous ethylene diamine bath at 105° F. and subsequently cured at 70° F. under water for 48 hours to give thread of the following physical properties: Tensile strength of 5–6000 p.s.i., elongation of 625–725%, 300% modulus of 900–1000 p.s.i., 500% modulus of 21–2400, 300% massaged modulus of 250 p.s.i. and a tensile set of 60%.

Thread made in accordance with the invention typically has physical properties as outlined in the table following which also includes typical values obtained with a high quality natural rubber thread for comparison purposes.

| | Polyurethane | Natural Rubber |
|---|---|---|
| Tensile at break, p.s.i. | 9,000 | 5,000 |
| Elongation at break, percent | 700 | 650 |
| Modulus at 500% p.s.i. | 1,800 | 1,800 |
| Percent set measured 1 minute after stretching 8 times to 600% elongation | 20 | 15 |

Such polyurethane thread may be used for any of the purposes to which ordinary rubber thread is put and is much superior to ordinary rubber thread in many respects. The superior properties include vastly higher tear and abrasion resistance, relative immunity to the deteriorating influences which rapidly destroy natural rubber thread such as light, ozone, heat, dry cleaning agents, chlorine etc.

Perhaps the most surprising characteristic of the thread of the invention is its remarkable resistance to abrasion. The usual rubber threads wear very easily as a result of abrasion and therefore they cannot be knitted. The present threads, in contrast, can be knitted and otherwise handled on textile machinery in a manner that has not heretofore been possible with elastomeric threads.

The superior strength and other desirable properties of the present thread are attributed largely to the fact that the greater portion of the cross-sectional area of the thread is a water cured polyurethane, that is, the main core or body of the thread, which is principally responsible for the strength of the thread, is a water cured polyurethane. In this respect the strength-imparting core of the thread is distinguished from the surface of the thread, which is essentially a diprimary diamine cured polyurethane.

It should be noted that in the present process the prepolymer is used directly as such and the use of solvents which are unnecessary and in fact undesirable is avoided, thus dispersing with fire and/or toxicity hazard, as well as expense.

The improved properties of the present thread are evidently a consequence in large part of the specific selection of an aromatic diisocyanate as the component of the prepolymer, since the employment of an aliphatic diisocyanate, in preparing the prepolymer does not provide the presently desired results. It will be appreciated that it was therefore indeed surprising and unexpected to find that aromatic diisocyanates would provide an excellent elastomeric thread when processed as described, in view of the failure of aliphatic diisocyanates to provide a satisfactory product. This discovery is believed to be directly contrary to such prior art teachings as those of Windemuth, 2,650,212.

The fact that the presently employed prepolymer consists of the polyester or the like and the diisocyanate, as described, is also in large measure responsible for the success of the present process, because such prepolymer represents an essentially stable material, being devoid of catalytic substances, that does not tend to set up or harden prematurely under ordinary operating conditions. A particularly favorable aspect of the invention resides in the combination of such catalyst-free prepolymer with an aqueous diprimary diamine setting bath, which enables the extruded catalyst-free liquid to be set rapidly so that it can be handled as a thread until such time as the water cure is undertaken. On the other hand, the excellent physical properties of the thread are undoubtedly attributable to the fact that the bulk of the thread is actually water-cured, as described. From the foregoing it will therefore be apparent that the present improved results are contingent upon the bringing together in combination of the described essential elements.

It will also be noted that in the present process the polyurethane is essentially completely formed beforehand, that is, the structure and composition of the polyurethane is practically entirely represented by the previously prepared prepolymer, prior to the actual thread-forming operation, and only a virtually insignificant small fraction of the weight of the polymer in the final thread is made up of the diprimary diamine from the setting bath or the water from the curing bath. Such pre-determination of the structure and composition of the polymer in the present method affords opportunity for exacting control, such as is not feasible in methods wherein thread is made directly by the action of the original polymer-forming ingredients on each other, as in U.S. Patents 2,708,617, Magat et al., May 17, 1955; 2,813,775, Steuber, November 19, 1957; and 2,813,776, Koller, November 19, 1957.

Having thus described our invention, what we claim and desire to protect by Letters Patent is:

1. An elastomeric thread comprising a polyurethane which is a reaction product of a polymer having terminal alcoholic hydroxyl groups selected from the group consisting of polyesters and polyethers with a 20% to 250% molar excess of an aromatic diisocyanate, the exterior surface of said thread being cured with an aliphatic diprimary diamine and the interior of the thread being cured with water.

2. An elastomeric thread comprising a surface layer, and an inner core surrounded by such surface layer, said surface layer comprising a cured polyurethane elastomer which is a reaction product of a polymer having terminal alcoholic hydroxyl groups, selected from the group consisting of polyesters and polyethers, an aromatic diisocyanate, and an aliphatic diprimary diamine, said inner core comprising a cured polyurethane elastomer which is a reaction product of the said polymer and the said diisocyanate, and water, the said diamine and the said water being the curing agents for the said surface layer and core, respectively.

3. A thread as in claim 2, in which the said polymer is ethylene-propylene adipate.

4. A thread as in claim 2, in which the said diisocyanate is p,p'-diphenylmethane diisocyanate.

5. A thread as in claim 2, in which the said diamine is ethylene diamine.

6. A thread as in claim 5, in which the said polymer is ethylene-propylene adipate, and the said diisocyanate is p,p'-diphenylmethane diisocyanate.

References Cited in the file of this patent

UNITED STATES PATENTS

| | | |
|---|---|---|
| 2,198,927 | Waterman et al. | Apr. 30, 1940 |
| 2,340,377 | Graumann et al. | Feb. 1, 1944 |
| 2,417,453 | Wade | Mar. 18, 1947 |
| 2,428,046 | Sisson et al. | Sept. 30, 1947 |
| 2,625,535 | Mastin et al. | Jan. 13, 1953 |
| 2,650,212 | Windemuth | Aug. 25, 1953 |
| 2,755,266 | Brenschede | July 17, 1956 |
| 2,777,831 | Seeger | Jan. 15, 1957 |
| 2,798,283 | Magot et al. | July 9, 1957 |
| 2,880,056 | Carr et al. | Mar. 31, 1959 |